United States Patent [19]

Ikeda et al.

[11] Patent Number: 4,840,749
[45] Date of Patent: Jun. 20, 1989

[54] PROCESS FOR PRODUCTION OF 1-AMINOANTHRAQUINONE

[75] Inventors: Noriaki Ikeda; Noboru Sugishima; Yasushi Fujii; Shinji Ikuta; Yoshiyuki Nakanishi, all of Himeji; Akira Inoue, Hirakata, all of Japan

[73] Assignee: Nippon Shokubai Kagaku Kogyo Co., Ltd., Osaka, Japan

[21] Appl. No.: 62,638

[22] Filed: Jun. 16, 1987

[30] Foreign Application Priority Data

Jun. 17, 1986 [JP] Japan .................................. 61-139311
Aug. 25, 1986 [JP] Japan .................................. 61-197083
Jan. 6, 1987 [JP] Japan ...................................... 62-110
Jan. 6, 1987 [JP] Japan ...................................... 62-111

[51] Int. Cl.$^4$ ............................................. C07C 97/12
[52] U.S. Cl. ..................................................... 260/378
[58] Field of Search ..................... 260/378, 369, 396 R

[56] References Cited

U.S. PATENT DOCUMENTS

| | | | |
|---|---|---|---|
| 3,745,180 | 7/1973 | Rennie | 260/396 |
| 3,873,580 | 3/1975 | Rennie | 260/396 |
| 4,369,140 | 1/1983 | Komatsu et al. | 260/369 |
| 4,632,982 | 12/1986 | Komatsu et al. | 260/369 |
| 4,639,298 | 1/1987 | Kreh et al. | 260/369 |

FOREIGN PATENT DOCUMENTS

| | | |
|---|---|---|
| 0075828 | 4/1983 | European Pat. Off. . |
| 2467187 | 4/1981 | France . |
| 1192037 | 5/1970 | United Kingdom . |
| 1351047 | 4/1974 | United Kingdom . |
| 1360904 | 7/1974 | United Kingdom . |
| 1370413 | 10/1974 | United Kingdom . |
| 1456083 | 12/1976 | United Kingdom . |
| 1462020 | 1/1977 | United Kingdom . |

OTHER PUBLICATIONS

Ho, Tse-Lok, "Ceric Ion Oxidation in Organic Chemistry", *Synthesis*, pp. 347-354, Sep. 7, 1972.
Dalrymple, I. M. and Millington, J. P., "An Indirect Electrochemical Process for Production of Naphthaquinone", *Journal of Applied Electrochemistry*, pp. 885-893, 1986.

*Primary Examiner*—Richard L. Raymond
*Assistant Examiner*—Raymond Covington
*Attorney, Agent, or Firm*—Sherman and Shalloway

[57] ABSTRACT

A process for producing 1-aminoanthraquinone, which comprises
(a) a step of oxidizing 1-nitronaphthalene in the liquid phase with an acidic aqueous solution containing a ceric ion as an oxidizing agent and separating crystals containing 5-nitro-1,4-naphthoquinone and the acidic aqueous solution containing a cerium ion from the resulting reaction mixture,
(b) a step of subjecting the 5-nitro-1,4-naphthoquinone obtained in step (a) to Diels-Alder reaction with 1,3-butadiene in a solvent, precipitating crystals containing the resulting 5-nitro-1,4,4a,9a-tetrahydroanthraquinone, separating them by filtration, separating and recovering the unreacted 1-nitronaphthalene and the solvent in the filtrate in a separation tower, and recycling 1-nitronaphthalene to step (a) for use as the starting material and re-using the recovered solvent for the Diels-Alder reaction,
(c) a step of reducing 5-nitro-1,4,4a,9a-tetrahydroanthraquinone obtained in step (b), separating crystals containing 1-aminoanthraquinone and purifying them, and
(d) a step of electrolytically oxidizing the acidic aqueous solution containing a cerium ion separated in step (a) to convert the cerous ion in the acidic aqueous solution to a ceric ion and recycling the resulting acidic aqueous solution containing a ceric ion to step (a) for re-use as the oxidizing agent.

10 Claims, 1 Drawing Sheet

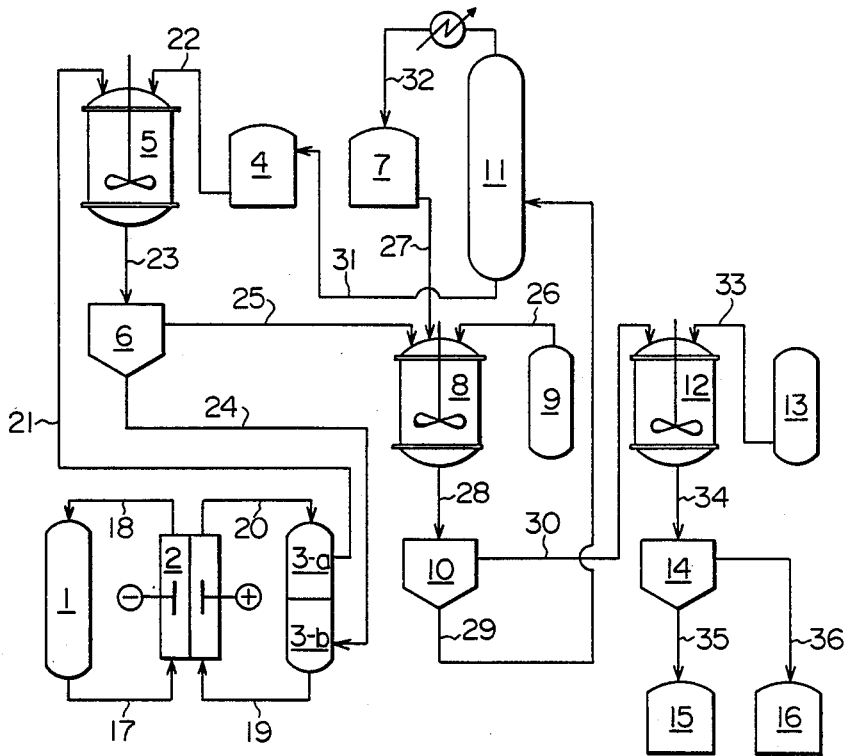

PROCESS FOR PRODUCTION OF 1-AMINOANTHRAQUINONE

This invention relates to a novel process for producing novel 1-aminoanthraquinone from 1-nitronaphthalene as a starting material. More specifically, it relates to a process for producing 1-aminoanthraquinone, which comprises oxidizing 1-nitronaphthalene in the liquid phase with an acidic aqueous solution containing a ceric ion (to be referred to as the "ceric ion-containing acidic aqueous solution"), subjecting the resulting 5-nitro-1,4-naphthoquinone to Diels-Alder reaction with 1,3-butadiene, and reducing the resulting 5-nitro-1,4,4a,9a-tetrahydroanthraquinone with a reducing agent.

The 1-aminoanthraquinone is industrially useful as an intermediate for anthraquinonic dyestuffs.

Known methods for producing 1-aminoanthraquinone from anthraquinone include, for example, sulfonation of anthraquinone and subsequent ammonolysis of the resulting anthraquinone-1-sulfonic acid (GB No. 1370413/1974)), and nitration of anthraquinone with concentrated nitric acid or mixed acid (GB No. 1351047/1974) and subsequent reaction of the resulting 1-nitroanthraquinone with ammonia or reduction of it with an alkali sulfide or hydrosulfide. The sulfonation method, however, gives rise to problems in regard to environmental pollution at the job site and elsewhere because it uses a mercury catalyst in the sulfonation step. The nitration method is disadvantageous in handling and treatment of the waste solution since the amounts of sulfuric acid and nitric acid used are large, and moreover is not industrially advantageous because the 1-aminoanthraquinone obtained contains much by-products such as the diamino and 2-amino compounds thereof, and a complex purifying operation is necessary in order to use it as an intermediate for dyestuffs.

There is also known a method which comprises subjecting 5-nitro-1,4-naphthoquinone to Diels-Alder reaction with 1,3-butadiene to form 5-nitro-1,4,4a,9a-tetrahydroanthraquinone, and reducing it (GB No. 1462020/1977). This method eliminates the aforesaid defects, and has no problem with respect to environmental pollution at the job site and elsewhere. It is economically disadvantageous, however, because purified 5-nitro-1,4-naphthoquinone is used as a starting material.

On the other hand, for the production of quinones, a method comprising oxidizing an aromatic compound with the ceric ion-containing acidic aqueous solution in the liquid phase to form the corresponding quinone is generally known. For example, (1) naphthalene dissolved in a water-immiscible organic solvent is oxidized with the ceric ion-containing acidic aqueous solution to form 1,4-naphthoquinone (GB No. 1192037/1967) (2) powdery naphthalene is suspended in an aqueous solution of a ceric salt with a dispersing agent to form 1,4-naphthoquinone (FR No. 2467187/1979). These known methods may be applied to the production of 5-nitro-1,4-naphthoquinone. In these oxidation reactions, an aqueous nitric acid solution of cerium ammonium nitrate and an aqueous sulfuric acid solution of cerium sulfate are generally used. The above process of the liquid-phase oxidation reaction usually includes a step of electrochemical regeneration of the cerous ion formed by the liquid-phase oxidation reaction to a ceric ion.

In the production of 1-aminoanthraquinone from 5-nitro-1,4-naphthoquinone as the starting material, the 1-aminoanthraquinone product does not have a high purity unless highly pure 5-nitro-1,4-naphthoquinone is used. 5-Nitro-1,4-naphthoquinone is usually produced by either nitration of 1,4-naphthoquinone or liquid-phase oxidation of 1-nitronaphthalene. The nitration method, however, yields large amounts of by-products such as dinitro and 6-nitro compounds. As shown in working examples of GB No. 1360904/1972, the yield of the product by liquid-phase oxidation is also low, and the amount of the impurities formed is large.

In the method of producing 5-nitro-1,4-naphthoquinone by liquid-phase oxidation of 1-nitronaphthalene with the ceric ion-containing acidic aqueous solution, the rate of the reaction is higher and the yield of the final oxide per unit hour is higher as the concentration of the ceric ion in the ceric ion-containing acidic aqueous solution is higher or the oxidation reaction temperature is higher. When the aqueous sulfuric acid solution of cerium sulfate is used, the solubility of cerous sulfate formed by the oxidation reaction with ceric sulfate is low. Hence, in order to avoid precipitation of the cerous sulfate during the reaction, the concentration of the ceric ion in the aqueous sulfuric acid solution of cerium sulfate should be reduced. Consequently, the rate of the reaction decreases.

Furthermore, in electrolysis of an acidic aqueous solution containing a cerium ion using a diaphragm, mixing of the catholyte solution and the anolyte solution through the diaphragms is a problem.

It is an object of this invention therefore to eliminate the aforesaid defects of the prior art, and to provide a method of producing highly pure 1-aminoanthraquinone highly selectively from 1-nitronaphthalene with good productivity without environmental pollution at the job site or elsewhere.

Extensive investigations of the present inventors in order to achieve the above object have now led to the discovery that 1-aminoanthraquinone with very small amounts of by-products such as the diamino compound or 2-amino compound thereof can be efficiently produced by oxidizing 1-nitronaphthalene with an acidic aqueous solution containing a ceric ion as an oxidizing agent in the liquid phase to form 5-nitro-1,4-naphthoquinone containing little by-product such as the z-nitro compound or the dinitro compound, then subJecting the product to Diels-Alder reaction with 1,3-butadiene in a solvent to form 5-nitro-1,4,4a,9a-tetrahydroanthraquinone, reducing the product with a reducing agent, and recovering and recycling the unreacted material, the solvent and the oxidizing agent.

The present invention provides a process for producing 1-aminoanthraquinone, which comprises
(a) a step of oxidizing 1-nitronaphthalene in the liquid phase with an acidic aqueous solution containing a ceric ion as an oxidizing agent and separating crystals containing 5-nitro-1,4-naphthoquinone and the acidic aqueous solution containing a cerium ion from the resulting reaction mixture,
(b) a step of subjecting the 5-nitro-1,4-naphthoquinone obtained in step (a) to Diels-Alder reaction with 1,3-butadiene in a solvent, precipitating crystals containing the resulting 5-nitro-1,4,4a,9a-tetrahydroanthraquinone, separating them by filtration, separating and recovering the unreacted 1-nitronaphthalene and the solvent in the filtrate in a separation tower, and recycling 1-nitronaphthalene to step (a) for use as the starting material and re-using the recovered solvent for the Diels-Alder reaction, (c) a step of reducing 5-nitro-1,4,4a,9a-tetrahydroanthraquinone obtained in step (b), separating crystals containing 1-aminoanthraquinone and purifying them, and (d) a step of electrolytically oxidizing the acidic aqueous solution containing a cerium ion separated in step (a) to convert the cerous ion in the acidic aqueous solution to a ceric ion and recycling the resulting acidic aqueous solution containing a ceric ion to step (a) for re-use as the oxidizing agent.

The step of oxidizing 1-nitronaphthalene with the ceric ion-containing acidic aqueous solution in the liquid phase is carried out with forced stirring by using a stirrer, external circulation, gas bubbling, and so on, preferably under ultrasonic irradiation. By ultrasonic irradiation on the reaction system, a much higher rate of the reaction can be obtained than in the case of merely effecting forced stirring. Hence, the reaction temperature can be decreased and the reaction time can be shortened. Thus, the productivity increases and the reaction proceeds highly selectively. In addition, since the amount of by-products is small, crystals containing 5-nitro-1,4-naphthoquinone having a sufficient purity can be obtained in the subsequent step only by using a relatively simple separating device.

Ultrasonic waves having a frequency of at least 10 KHz are preferred. Ultrasonic irradiation may be performed externally or internally. Devices having various frequecies and outputs may be used as a device for generating ultrasonic waves, and an ultrasonic generator of any type such as a flat plate, ring or circular plate type may be used. Irradiation may be carried out continuously or intermittently during the reaction. Ultrasonic irradiation may effectively be applied only in the latter stage of the reaction at which the rate of the reaction is decreased.

The reaction temperature is preferably 20° to 100° C., more preferably 20° to 90° C., especially preferably 50° to 80° C. If the temperature is too low, the rate of the reaction is decreased. If it is too high, hydrolysis of the ceric salt occurs, or the product contains products of side-reactions such as polymerization or is colored. Or corrosion occurs in the reaction equipment.

Usually, nitric acid and acetic acid are used as the acid in the acidic aqueous solution. Nitric acid or acetic acid is preferred in view of its high oxidizing power. The concentration of nitric acid in the aqueous nitric acid solution is preferably 0.3 to 10 moles/liter, more preferably 0.5 to 5 moles/liter, and the concentration of acetic acid in the aqueous solution of acetic acid is preferably 0.1 to 10 moles/liter. If these concentrations are too high, the reaction equipment is disadvantageously corroded, and the yield is low. If they are too low, the ceric ion becomes inconveniently unstable.

Acidic aqueous solutions of various ceric salts or acidic aqueous solutions containing a ceric ion obtained by electrolytically oxidizing acidic aqueous solutions containing various cerous salts may be used as the ceric ion-containing acidic aqueous solution. An acidic aqueous solution of ceric ammonium nitrate and a ceric ion-containing acidic aqueous solution obtained by electrolytically oxidizing an acidic aqueous solution containing cerous nitrate or cerous ammonium nitrate are preferably used since the concentration of the ceric ion in these aqueous solution can be maintained high and they have higher oxidizing power than other cerium sources such as cerium sulfate.

The concentration of the ceric ion in the acidic aqueous solution is preferably 0.1 to 6 mole/liter, more preferably 0.2 to 5 moles/liter. If the concentration is too low, the oxidizing power of the acidic aqueous solution is low and the rate of the reaction is low. Furthermore, the amount of the reaction solution becomes disadvantageously high. On the other hand, if its concentration is too high (the amount of the cerium salt dissolved is large), the viscosity of the solution increases, and this is likely to hinder the various operations of the process.

In step (a), 1-nitronaphthalene may be used as such or in the form of a solution in a water-immiscible organic solvent. Preferably, the solvent is not used. The use of solvent requires its recovery in a subsequent step and the cost of the equipment and utilities disadvantageously increases. Examples of the solvent that may be used are aromatic hydrocarbons and derivatives thereof such as benzene, tertiary butylbenzene and chlorobenzene; aliphatic hydrocarbons such as cyclohexane, n-hexane, n-pentane and n-octane; and chlorinated aliphatic hydrocarbons such as carbon tetrachloride, chloromethylene and dichloroethane.

The reaction mixture obtained in step (a) is subjected to crystallization treatment, and the precipitated crystals containing 5-nitro-1,4-naphthoquinone and the unreacted 1-nitronaphthalene were separated into the crystals and a filtrate by centrifugation, filtration, etc. As required, the acidic aqueous solution containing a cerium ion and the organic layer are separated from the filtrate. The crystals are sent to step (b), and the cerium ion-containing acidic aqueous solution, to step (d). The organic layer is composed mainly of 5-nitro1,4-naphthoquinone in an amount corresponding to its solubility, the unreacted 1-nitronaphthalene and the solvent (when used). It is sent to step (d) without separation from the aqueous solution, or recycled to step (a) after it is separated from the aqueous solution.

The acidic aqueous solution containing a cerium ion contains 5-nitro-1,4-naphthoquinone and 1-nitronaphthalene in amounts corresponding to their solubilities or 3-nitrophthalic acid, phthalic acid, 1,4-naphthoquinone, etc. formed by the liquid-phase oxidation reaction. Among these organic compounds, 5-nitro-1,4-naphthoquinone and 1,4-naphthoquinone are oxidized to 3-nitrophthalic acid and phthalic acid respectively in step (d). Therefore, when the process of this invention is operated continuously, it is likely that crystals of 3-nitrophthalic acid and phthalic acid will precipitate and get mixed with the separated 5-nitro-1,4-naphthoquinone crystals, or will clog the lines. The present inventors analyzed the crystals and filtrate separated from the reaction mixture of the liquid-phase oxidation reaction by filtration, etc., and found that 3-nitrophthalic acid and phthalic acid exist in an oversaturated state in the acidic aqueous solution containing a cerium ion.

Cooling and application of mechanical shock are known as methods of crystallizing the oversaturated portion of organic compounds. Extensive investigations of the present inventors have led to the surprising discovery that irradiation of ultrasonic waves having a frequency of, preferably, 10 KHz or more to the acidic aqueous solution containing a cerium ion and 3-nitrophthalic acid and phthalic acid to oversaturation can easily induce crystallization of the oversaturated portion of the organic compounds. This brings about the advantage that the concentration of the organic compounds in the cerium ion-containing acidic aqueous solution can be maintained low, and effects on the electrodes and electrolytic characteristics in steps (d) are decreased, the purity of 5-nitro-1,4-naphthoquinone separated after the liquid-phase oxidation reaction is increased, and the reaction, isolation and purification operations in steps (b) and (c) become easy. Preferably, ultrasonic irradiation is carried out under cooling. The addition of a very small amount of seeds such as 3-nitrophthalic acid and phthalic acid at the time of ultrasonic irradiation can almost instantaneously crystallize the oversaturated portion of the organic compounds. When this process is performed, 1-aminoanthraquinone obtained through steps (b) and (c) does not contain impurities such as carcinogenic 2-aminoanthraquinone, and has a high purity.

The Diels-Alder reaction of 5-nitro-1,4-naphthoquinone and 1,3-butadiene in step (b) is carried out by using a suitable solvent capable of dissolving both of these compounds. Examples of such a solvent include aromatic hydrocarbons such as benzene, toluene, xylene, halogenated hydrocarbons such as dichloroethane, carbon tetrachloride and dichlorobenzene, ethers such as diethyl ether and diphenyl ether, esters such as dioctyl phthalate and methyl acetate: ketones such as acetone and methyl ethyl ketone, alcohols such as methanol and ethanol, and Cellosolves such as methyl Cellosolve and ethyl Cellosolve. The Diels-Alder reaction of 5-nitro-1,4-naphthoquinone and 1,3-butadiene is carried out generally at a temperature of 0° to 200° C., preferably 20° to 120° C. If the reaction temperature is too high, the solubility of 1,3-butadiene decreases, and the reaction is difficult of proceeding. Furthermore, the resulting 5-nitro-1,4,4a,9a-tetrahydroanthraqunone is changed into other substances by side reactions such as isomerization, dehydrogenation, and polymerization of the starting 5-nitro-1,4-naphthoquinone and 1,3-butadiene also occur. Hence, the reaction selectivity is reduced. On the other hand, if the reaction temperature is too low, the rate of the reaction is decreased. The reaction pressure depends, for example, upon the solubility of 1,3-butadiene, but is usually not more than 50 kg/cm²G, more generally 0 to 20 kg/cm²G. As the amount of 1,3-butadiene used is more excessive with respect to 5-nitro-1,4-naphthoquinone, the reaction is completed faster. If it is too excessive, the process is not economically feasible in regard to the equipment required. The preferred mole ratio of 1,3-butadiene to 5-nitro-1,4-naphthoquinone is 1 to 20, especially 1.1 to 10. The reaction time varies depending upon various reaction conditions such as the concentration of 1,3-butadiene, the reaction temperature and the reaction pressure, and an optimum reaction time is selected for each set of the reaction conditions.

Reduction in step (c) of 5-nitro-1,4,4a,9a-tetrahydroanthraquinone obtained in step (b) easily gives 1-aminoanthraquinone. Reduction may be carried out by any of a method involving direct use of a reducing agent, a direct electrolysis method, a method of indirect electrolytic reduction using a solution containing a metallic ion having reducing activity, and a method comprising reacting the 5-nitro-1,4,4a,9a-tetrahydroanthraquinone with a basic compound to convert it to 1-hydroxylaminoanthraquinone and subsequently reducing it (GB No. 1457083/1976). Illustrative of the reducing agent which may be used in the reducing operation are hydrogen; relatively unstable hydrogen compounds such as hydrogen iodide, hydrogen sulfide, lithium aluminum hydride and sodium borohydride; lower oxides or salts of oxyacid such as carbon dioxide, sulfur dioxide and sulfites; sulfur compounds such as sodium sulfide, sodium hydrosulfide and ammonium sulfide; metals having high electrically cationic property or amalgams thereof such as alkali metals, magnesium and calcium; salts of metals in the low valency state such as iron (II), tin (II), titanium (III) and chromium (II); organic compounds having the action of a reducing agent such as aldehydes, formic acid and oxalic acid.

In step (c), water-soluble solvents such as acetone, methanol, ethanol, isopropanol and methyl Cellosolve may be used as a solvent. Water-immiscible solvents such as toluene and xylene may also be used, in which case ammonia or an organic amine is added to the reaction system. Examples of the organic amine are aliphatic primary amines such as methylamine and ethylamine, aliphatic secondary amines such as dimethylamine and diethylamine, aliphatic tertiary amines such as allylamine and diallylamine, alicyclic amines such as cyclopropylamine and cyclobutylamine, and aromatic amines such as aniline, benzylamine and diphenylamine. The reaction is carried out at a reaction temperature of usually 50° to 150° C., preferably 60° to 120° C., chosen depending upon the solvent used. If the reaction temperature is too high, the starting 5-nitro-1,4,4a,9a-tetrahydroanthraquinone is changed to other substances by side reactions such as isomerization and dehydration. If the reaction temperature is too low, the rate of the reaction is reduced.

Step (d) of electrolytic oxidation is carried out preferably by using a diaphragm. If it is carried out in the absence of a diaphragm, reduction of a nitrate ion which may be contained in the acidic aqueous solution containing a cerous ion to a nitrite ion or an ammonium ion can occur on the cathode side. This changes the concentrations of the individual ions or the pH of the solution and in turn, the ability of the ceric ion as an oxidizing agent. Hence, the reaction conditions should be varied. Furthermore, the ceric ion formed on the anode might be reduced again to a cerous ion at the cathode, and this decreases the current efficiency. It is preferred therefore to perform electrolytic oxidation while the acidic aqueous solution containing a cerous ion as the anolyte is separated from an electrolyte solution as the catholyte solution by means of a diaphragm. Desirably, the diaphragm has the property of preventing the aforesaid inconveniences, and various ion exchange membranes may be suitably used as the diaphragm. Fluorine-type cation exchange membranes or anion exhange membranes are preferred because they also have excellent durability.

Cation exchange membranes or anion exchange membranes may be used as such or after their surfaces are modified. A multilayer-membrane composed of at least two membrane layers having different ion exchange capacities may also be used. The latter type of membrane is effective in preventing a reduction in current efficiency owing to the migration of the cerium ion from the anode chamber to the cathode chamber because it is selectively permeable to a hydrogen ion and inhibits permeation of the cerium ion. A combination of an anion exchange membrane and a cation exchange membrane may also be used. This combination includes, for example, the provision of at least one cation exchange membrane and at least one anion exchange membrane between the anode and the cathode (multi-chamber type electrolytic cell), a laminated ion exchange membrane obtained by laminating an anion exchange membrane and a cation exchange membrane, a cation exchange membrane whose surface is modified to introduce an anion exchange thin layer locally, and an anion exchange membrane whose surface is modified to introduce a cation exchange thin layer locally, The catholyte may be any electorolytic solution, but in the case of a two-compartment type electrolytic cell, preferably does not contain nitric acid. If it contains a nitrate ion, it is reduced to an ammonium ion at the cathode and the pH of the catholyte rises. Consequently, the components of the catholyte solution may get mixed with the anolyte, and the increased pH induces hydrolysis of the ceric ion. When the anolyte solution contains a nitrate ion, a cation exchange membrane is preferably used as the diaphragm in order to prevent the nitrate ion from being mixed with the catholyte solution.

The electrolytic cell may, for example, be a two-chamber type electrolytic cell consisting of an anode chamber and a cathode chamber, and a multi-chamber type electrolytic cell using two or more diaphragms. An example of the latter is a three-chamber electrolytic cells using two diaphragms. In this case, a cation exchange membrane, an anion exchange membrane and porous membranes such as one made of ceramics may be used as two diaphrams provided between the cathode chamber and an intermediate chamber and between the intermediate chamber and the anode chamber. To avoid mixing of the anolyte and the catholyte through the intermediate layer, at least one of the two diaphragms is preferably an ion exchange membrane. More preferably, a combination of an anion exchange membrane and a cation exchange membrane is used. Such a three-chamber electrolytic cell is especially preferred because in order to avoid mixing of the anolyte solution with the catholyte solution, it permits use of an ordinary commercial membrane without the need to use a special ion exchange membrane.

When such a three-chamber type electrolytic cell is used, the anolyte solution is isolated from the catholyte solution by the solution in the intermediate chamber. The aforesaid problem can therefore be avoided, and no restriction is imposed on the type of the catholyte solution.

In either of the above cases, the utilization of a cathode reaction in reducing step (c) is economically advantageous and preferred.

Preferred embodiments of the present invention will be described below more specifically with reference to the accompanying drawing which is a flow sheet showing the continuous process for producing 1-aminoanthraquinone without using a solvent in the liquid-phase oxidation reaction. In the drawing, the reference numeral 1 represents a tank holding a catholyte solution; 2, an electrolytic cell; 3-a and 3-b, a tank holding an anolyte solution (anolyte solution tanks 3-a and 3-b are not necessarily separated); 5, a tank holding 1-nitronaphthalene; 5, a reactor for the liquid-phase oxidation; 6, 10 and 14, a filter; 7, a tank holding a solvent; 8, a reactor for the Diels-Alder reaction; 9, a tank holding 1,3-butadiene; 11, a separation tower; 12, a reactor for the reducing reaction; 13, a tank holding a reducing agent; 15, a tank holding the waste liquor; and 16, a tank holding the product (1-aminoanthraquinone).

A cathode and an anode of the electrolytic cell 2 are isolated by a diaphragm. On the cathode side, the catholyte in the tank 1 is introduced into the electrolytic cells through a line 17, and circulated to the tank 1 from the electrolytic cell 2 via a line 18. In the meantime, on the anode side, an acidic aqueous solution containing a cerous ion in the tank 3-b is introduced into the electrolytic cell 2 through a line 19 and circulated to the tank 3-a via a line 20. During this time, the cerous ion in the acidic aqueous solution is oxidized to a ceric ion. The anolyte solution containing a ceric ion in a predetermined concentration is introduced into the reactor 5 for the liquid-phase oxidation from the tank 3-a via a line 21, and 1-nitronaphthalene is introduced into the reactor 5 via the tank 4. In the reactor 5, 1-nitronaphthalene is oxidized in the liquid phase with the ceric ion. The reaction product is filtered in the filter 6, and crystals of 5-nitro-1,4-naphthoquinone and the unreacted 1-nitronaphthalene are introduced into the reactor 8 for the Diels-Alder reaction. In the meantime, the filtrate, i.e., the acidic aqueous solution containing cerous and ceric ions is returned to the tank 3-b via a line 24, and then regenerated to a solution containing a ceric ion in the electrolytic cell 2.

The 5-nitro-1,4-naphthoquinone introduced into the reactor 8 for the Diels-Alder reaction is subjected to Diels-Alder reaction with 1,3-butadiene introduced from the tank 9 via a line 26 at a suitable temperature under a suitable pressure in the presence of a suitable solvent introduced from the tank 7 via a line 27. Since the unreacted 1-nitronaphthalene present in the reaction solution does not react with 1,3-butadiene, no side reaction occurs. The reaction mixture is filtered in the filter 10. The crystals of 5-nitro-1,4,4a,9a-tetrahydroanthraquinone formed by the Diels-Alder reaction are sent to the reactor 12 for the reducing reaction via a line 30, and reduced with a suitable reducing agent introduced from the tank 13 via a line 33 to form 1-aminoanthraquinone. Meanwhile, the filtrate is sent to the separation tower 11 via a line 29 and separated into the solvent and 1-nitronaphthalene by, for example, distillation. The solvent is sent to the tank 7 via a line 32, and 1-nitronaphthalene is recycled to the tank 4 via line 31 for re-use.

The reaction mixture containing crystals of 1-aminoanthraquinone is sent to the filter 14 via a line 34 from the reactor 12, filtered and washed, and then stored in the product tank 16. The filtrate is stored in the waste liquor tank 15 and properly disposed of.

The following Examples illustrate the present invention in greater detail. It should be understood however that the invention is not limited to these Examples.

EXAMPLE 1

An aqueous nitric acid solution of cerous nitrate (2 moles/liter) was electrolyzed in electrolytic cell 2 at a current density of 10 $A/dm^2$ using PT-plated Ti electrodes as an anode and a cathode and a fluorinetype cation exchange membrane (Nafion 423, a tradename for a product of E. I. du Pont de Nemours & Co.) as a diaphragm. An anolyte solution in which the concentration of a ceric ion was 2.4 moles/liter (based on the 2 mole/liter aqueous nitric acid solution) was obtained. A 2 mole/liter aqueous solution of nitric acid was used as a catholyte solution. The current efficiency was 95%.

One hundred kilograms of 1-nitronaphthalene was oxidized with 3954 kg of the aqueous nitric acid solution containing a ceric ion at 50° C. for about 1 hour with stirring while ultrasonic waves (28 KHz and 400 W) were irradiated internally. The resulting crystals were separated in filter 6. The filtrate is sent to tank 3-*b* in order to electrolytically regenerate the cerous ion formed by the reaction. The crystals were washed and then introduced into reactor 8 for the Diels-Alder reaction. The content of 5-nitro-1,4-naphthoquinone (NNQ) in the washed crystals was 101.4 kg as a result of gas chromatographic analysis.

About 300 kg of methanol and 67.4 kg of 1,3-butadiene were charged into reactor 8 for the Diels-Alder reaction which contained the crystals, and reacted at 90° C. under a pressure of 3 kg/cm$^2$ for 25 hours.

Thereafter, the resulting crystals and the reaction solution were transferred to reactor 12 for the reducing reaction, and 154.1 kg of a 30% aqueous solution of sodium hydrosulfide was added. The reaction was carried out at 90° C. under atmospheric pressure for 2 hours. Red crystals were obtained. The crystals were separated by filtration, washed and dried. The weight of the dried crystals was 106.9 kg.

Gas chromatogphic and infrared spectral analyses of the product led to the determination that it was 1-aminoanthraquinone (AAQ) having a purity of 99.0%. The yield of pure 1-aminoanthraquinone was 105.8% by weight.

EXAMPLES 2-9

Example 1 was repeated except that the reaction conditions in each of the steps were changed as shown in the following Table. The results are also shown in the Table.

TABLE

| | | Electrolysis step | | | Liquid-phases oxidation step | | | | | | |
|---|---|---|---|---|---|---|---|---|---|---|---|
| Example | Diaphragm | Cerium source | Current density (A/dm$^2$) | Current efficiency (%) | Solvent | Concentration of Ce$^{4+}$ (mole/liter) | Acid | Acid concentration (mole/liter) | Ultrasonic wave (KHz/W) | Temperature (°C.) | Time (hr) | NNQ Weight (kg) |
| 1 | Fluorine-type cation exchange membrane | Cerous nitrate | 10 | 95 | — | 2.4 | Nitric acid | 2.0 | 28/200 | 50 | 1.0 | 101.4 |
| 2 | Fluorine-type cation exchange membrane | Cerous nitrate | 10 | 93 | — | 2.4 | Nitric acid | 2.0 | 10/300 | 50 | 1.0 | 101.1 |
| 3 | Fluorine-type anion exchange membrane | Cerous nitrate | 10 | 97 | — | 1.3 | Nitric acid | 2.0 | — | 60 | 1.5 | 100.9 |
| 4 | Fluorine-type cation and anion exchange membranes in 3 chamber-type cell | Cerous nitrate | 10 | 98 | — | 1.3 | Nitric acid | 2.0 | — | 80 | 1.5 | 100.2 |
| 5 | Fluorine-type laminated cation and anion membrane | Cerous nitrate | 10 | 97 | n-hexane | 5.0 | nitric acid | 5.0 | 40/600 | 20 | 2.0 | 98.8 |
| 6 | Fluorine-type laminated cation and anion membrane | Cerous ammonium nitrate | 15 | 72 | t-butyl-benzene | 3.3 | nitric acid | 3.0 | — | 30 | 2.5 | 99.7 |
| 7 | Fluorine-type laminated cation and anion membrane | Cerous ammonium nitrate | 10 | 97 | — | 0.2 | nitric acid | 0.5 | — | 90 | 1.5 | 98.3 |
| 8 | Fluorine-type laminated cation and anion membrane | Cerous nitrate | 10 | 94 | — | 0.1 | nitric acid | 0.3 | — | 100 | 1.5 | 97.9 |
| 9 | — | Cerous nitrate | 10 | 81 | — | 2.0 | Acetic acid | 2.0 | — | 50 | 2.0 | 101.5 |

TABLE-continued

| | Diels-Alder reaction step | | | | | Reducing reaction step | | | AAQ | |
|---|---|---|---|---|---|---|---|---|---|---|
| | | | | | | | | | Yield | |
| Example | Solvent | Butadiene/NNQ (mole/ratio) | Temperature (°C.) | Pressure (Kg/cm$^2$) | Time (hrs) | Reducing agent | Solvent | Temperature (°C.) | Time (hrs) | (wt. %) | Purity (%) |
| 1 | Methanol | 2.5 | 90 | 3 | 2.5 | 30% aq. sodium hydrosulfide | — | 90 | 2.0 | 105.8 | 99.0 |
| 2 | Methyl Cellosolve | 1.0 | 30 | 3 | 4.0 | 30% aq. sodium hydrosulfide | Methyl Cellosolve | 120 | 1.5 | 101.5 | 99.1 |
| 3 | Xylene | 2.0 | 120 | 5 | 2.0 | Methylamine | Xylene | 50 | 3.0 | 96.1 | 98.1 |
| 4 | Xylene | 1.1 | 200 | 7 | 2.5 | Methylamine | Xylene | 80 | 3.0 | 100.2 | 98.8 |
| 5 | Dichlorobenzene | 4.5 | 100 | 5 | 2.0 | 30% aq. sodium hydrosulfide | — | 150 | 1.5 | 98.6 | 98.6 |
| 6 | Methyl Cellosolve | 1.0 | 30 | 15 | 4.0 | 30% aq. sodium hydrosulfide | Methyl Cellosolve | 90 | 2.0 | 104.1 | 99.0 |
| 7 | Methyl Cellosolve | 1.5 | 40 | 10 | 3.0 | 25% aq. sodium sulfide | Methyl Cellosolve | 60 | 3.0 | 97.6 | 99.1 |
| 8 | Methanol | 20 | 0 | 50 | 8.0 | 25% aq. sodium sulfide | Methanol | 120 | 1.5 | 95.1 | 99.0 |
| 9 | Methanol | 10 | 20 | 20 | 6.0 | 25% aq. sodium sulfide | " | 90 | 2.0 | 102.9 | 99.1 |

As shown in the above Examples, 5-nitro-1,4-naphthoquinone with little by-products can be produced in the step of oxidizing 1-nitronaphthalene in the liquid phase. Hence, highly pure 1-aminoanthraquinone free from carginogenic 2-aminoanthraquinone and other by-products can be advantageously produced without the need for a complex purifying operation in the Diels-Alder reaction step and the reducing reaction step and also without involving environmental pollution in the job site and elsewhere.

What is claimed is:

1. A process for producing 1-aminoanthraquinone, which comprises
   (a) a step of oxidizing 1-nitronaphthalene in the liquid phase with an acidic aqueous solution containing a ceric ion, except aqueous sulfuric acid solution containing ceric sulfate, as an oxidizing agent and separating crystals containing 5-nitro-1,4-naphthoquinone and the acidic aqueous solution containing a cerium ion from the resulting reaction mixture,
   (b) a step of subjecting the 5-nitro-1,4-naphthoquinone obtained in step (a) to Diels-Alder reaction with 1,3-butadiene in a solvent, precipitating crystals containing the resulting 5-nitro-1,4,4a,9a-tetrahydroanthraquinone, separating them by filtration, separating and recovering the unreacted 1-nitronaphthale and the solvent in the filtrate in a separation tower, and recycling 1-nitronaphthalene to step (a) for use as the starting material and re-using the recovered solvent for the Diels-Alder reaction,
   (c) a step of reducing 5-nitro-1,4,4a,9a-tetrahydroanthraquinone obtained in step (b), separating crystals containing 1-aminoanthraquinone and purifying them, and
   (d) a step of electrolytically oxidizing the acidic aqueous solution containing a cerium ion separated in step (a) to convert the cerous ion in the acidic aqueous solution to a ceric ion and recycling the resulting acidic aqueous solution containing a ceric ion to step (a) for re-use as the oxidizing agent.

2. The process of claim 1 wherein the step (a), ultrasonic waves having a frequency of at least 10 KHz are irradiated onto the reaction system.

3. The process of claim 1 or 2 wherein nitric acid of 0.3 to 10 moles/liter concentration is used as the acid in the acidic aqueous solution used in step (a).

4. The process of claim 1 or 2 wherein acetic acid of 0.1 to 10 moles/liter concentration is used as the acid in the acidic aqueous solution used in step (a).

5. The process of claim 1 wherein the liquid-phase oxidation reaction in step (a) is carried out at a temperature of 20° to 100° C.

6. The process of claim 1 or 2 wherein the step (a), the oversaturated portion of organic compounds is precipitated from the acidic aqueous solution containing a cerium ion separated from the liquid-phase oxidation reaction mixture, the crystals of the organic compounds are removed from the reaction system, and thereafter, the acidic aqueous solution containing a cerium ion is introduced into step (d).

7. The process of claim 1 wherein in step (d), the electrolysis is carried out by using an acidic aqueous solution containing a cerous ion as an anolyte solution, an electrolyte solution as a catholyte solution, and an anion exchange membrane as a diaphragm.

8. The process of claim 7 wherein in step (d), the diaphragm is a fluorine-type ion exchange membrane.

9. The process of claim 7 or 8 wherein in step (d), the diaphragm is a combination of an anion exchange membrane and a cation exchange membrane.

10. A process for producing 1-aminoanthraquinone, which comprises (a) oxidizing 1-nitronaphthalene in the liquid phase with an acidic aqueous solution consisting essentially of nitric acid or acetic acid containing a ceric ion reducible to a cerous ion as an oxidizing agent and separating crystals containing 5-nitro-1,4-naphthoquinone and said acidic aqueous solution containing a cerium ion from the resulting reaction mixture, (b) subjecting said 5-nitro-1,4-nathphoquinone obtained in step (a) to Diels-Alder reaction with 1,3-butadiene in a solvent, precipitating crystals containing the resulting 5-nitro-1,4 4a, 9a-tetrahydroanthraquinone, separating said crystals by filtration, separating and recovering the unreacted 1-nitronaphthalene and the solvent in the filtrate in a separation tower, and recycling said 1-nitronaphthalene to step (a) for use as the starting material and re-using said recovered solvent for the Diels-Alder reaction, (c) reducing said 5-nitro-1,4,4a,9a-tetrahydroanthraquinone obtained in step (b) to form 1-aminoanthraquinone, separating crystals containing 1-aminoanthraquinone and purifying said crystals, and (d) electrolytically oxidizing said acidic aqueous solution containing cerium ion separated in step (a) to convert the cerous ion in said acidic aqueous solution to a ceric ion and recycling the resulting acidic aqueous solution containing a ceric ion to step (a) for re-use as the oxidizing agent.

* * * * *

UNITED STATES PATENT AND TRADEMARK OFFICE
CERTIFICATE OF CORRECTION

PATENT NO. : 4,840,749
DATED : June 20, 1989
INVENTOR(S) : NORIAKI IKEDA ET AL.

It is certified that error appears in the above-identified patent and that said Letters Patent is hereby corrected as shown below:

Claim 1, line 17 of the claim, "nitronaphthale" should read
--nitronaphthalene--.

Claim 2, line 1 of the claim, "the step" should read
--in step--.

Claim 6, line 1 of the claim, "the step" should read
--in step--.

Claim 10, line 11 of the claim, "nathphoquinone" should read
--naphthoquinone--;
lines 14 and 15 of Claim 10, "5-nitro-1,4 4a 9a-tetrahydroquinone" should read --5-nitro-1,4,4a,9a-tetrahydroquinone--.

Signed and Sealed this

Thirteenth Day of March, 1990

*Attest:*

JEFFREY M. SAMUELS

*Attesting Officer*   *Acting Commissioner of Patents and Trademarks*